Dec. 29, 1936.  L. KARON  2,065,810

ANTISKID DEVICE

Filed April 24, 1936

INVENTOR.

LOUIS KARON,

BY

Geo Stevens
ATTORNEY.

Patented Dec. 29, 1936

2,065,810

UNITED STATES PATENT OFFICE 2,065,810

ANTISKID DEVICE

Louis Karon, Superior, Wis.

Application April 24, 1936, Serial No. 76,181

3 Claims. (Cl. 152—14)

This invention relates to anti-skid devices, and has particular reference to such adapted for service with heavy duty vehicles, such as trucks, graders, tractors, or plows, although by reducing the size and weight it may be used for pleasure car service as well.

The principal object of the invention is to provide a device which is easily applicable to a large size tire, and one which does not necessitate the jacking up of a wheel in order to apply the device.

Another object is to provide such a device with which the usual anti-skid cross chains may be used.

Still other objects and advantages of the invention will appear in the following description thereof.

Referring now to the accompanying drawing, forming part of this application, and wherein like reference characters indicate like parts:

Figure 1:
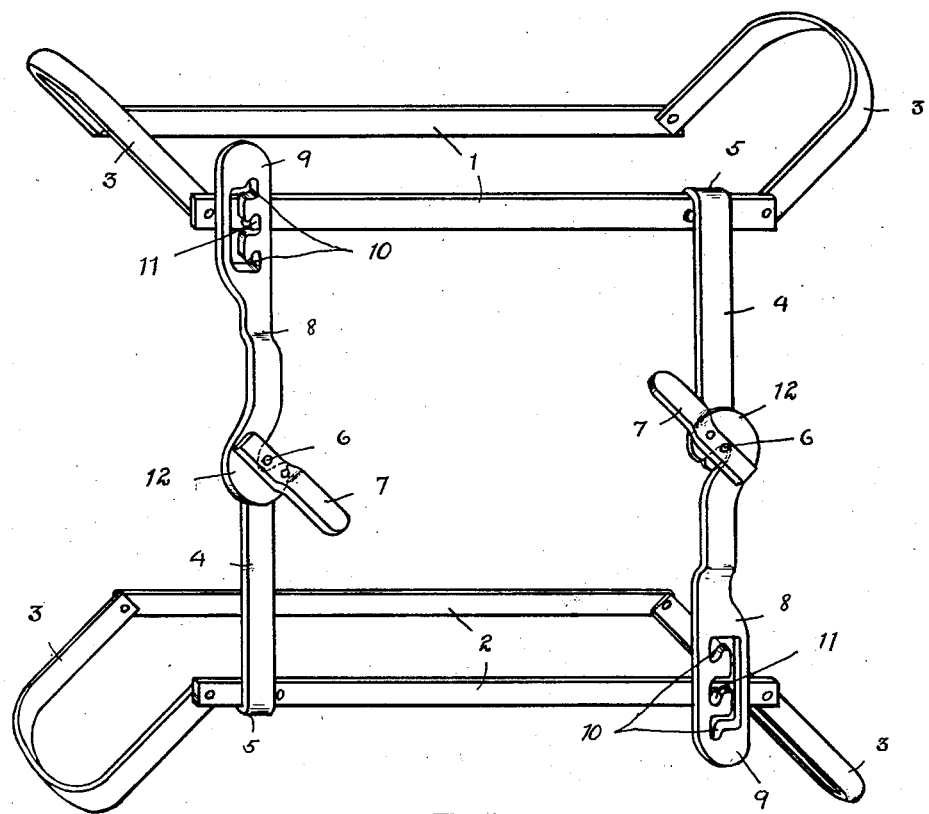
Figure 1 is a perspective view of one of my improved anti-skid devices approximately as it would appear applied to a tire.

The general assembly of the anti-skid device comprises two pairs of spaced bars at either end of each pair of which is pivotally fixed a U-shaped member for engagement transversely about the circumference of the tire, and a pair of adjustable clamping members for convenience in securing the assembly about the tire of a vehicle.

The two pairs of spaced bars are indicated at 1—1 and 2—2, and at either end of each of which is pivotally united a U-shaped member 3, the angular relation of which members to the bars 1—1 or 2—2 may be varied according to the size of the tire to which the device is applied. It is obvious that these two sections of bars and U-shaped members are to be placed oppositely upon the tire, and to hold them thereupon in such relation there is provided a pair of adjustable clamping members at either end of said sections and by means which they may be drawn together and thus snugly held about the tire. Each pair of adjustable clamping members comprises the hooked bar 4, one end of which is bent over as at 5 for hooked engagement about either one of the bars 1—1 or 2—2. Through the other end of the bars 4 extends a pin 6, which pin forms the means for securing the operating lever 7 thereto but spaced therefrom a distance equal to the thickness of the metal. The other member of each adjustable clamp comprises the bar 8, one end of which is enlarged as at 9 and provided with a series of L-shaped notches 10, in any one of which may be adjustably engaged the pin 11 projecting from one of the bars 1—1 and 2—2, and the other end of said member is bent in hooked form as at 12, and adjacent the free end of said hook is pivoted as at 13 to the lever 7. It will thus be apparent that the members 4 and 8 are adjustable as to length by means of the eccentric mounting of the levers 7 thereof, and the series of L-shaped slots 10.

Figure 2:
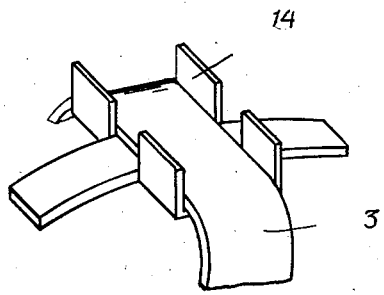
Figure 2 is a similar view of an auxiliary device for use in cooperation with that shown in Figure 1 when encountering soft or unusually slippery roads.

In cases requiring greater traction than ordinary, I have provided a channel shaped member indicated in Figure 2 of the drawing at 14, the width of the channel being substantially equal to the width of the material of which the members 3 are formed, so that the channel may be slipped between the tire and the members 3 with the webs of the channel projecting to provide additional traction. To further the non-slipping qualities of the member 14, a portion of each web is shown as being cut and bent over in curved form approximating the curvature of the circumference of a tire so that it will lie flatly thereupon and prevent pitching of the channel as well as its tendency to roll.

It is also apparent that if desired sections of anti-skid chains may be attached from one to the other of the bars 1—1, 2—2, to further the tractability of the device.

The simplicity and convenience of the device are deemed obvious without further explanation, and also it is apparent that other modifications within the scope of the following claims may be resorted to without departing from the spirit of the invention.

Having thus described my invention, what I claim and desire to secure by Letters Patent, is:

1. In a traction device of the type described, two pairs of spaced bars each having U-shaped traction means pivoted to the ends thereof, adjustable means removably uniting one of the bars of each pair, and a lever associated eccentrically with said adjustable means for varying the length of the latter.

2. In a traction device of the type described, two pairs of spaced bars each having U-shaped traction means pivoted to the ends thereof, eccentrically adjustable means removably uniting one of the bars of each pair, said means having a hooked engagement with one of the bars and an adjustable engagement with the other.

3. In a traction device of the type described, two pairs of spaced bars each having traction means pivoted to the ends thereof, and adjustable clamping members one end of each of which hookably engages one of said spaced bars and the other end of each of which adjustably engages the other of said spaced bars, and eccentric means for varying the length of the clamping members.

LOUIS KARON.